United States Patent
Chapple et al.

(10) Patent No.: US 7,863,767 B2
(45) Date of Patent: Jan. 4, 2011

(54) TURBINE DRIVEN ELECTRIC POWER PRODUCTION SYSTEM AND A METHOD FOR CONTROL THEREOF

(75) Inventors: Peter Chapple, Bradford-on-Avon (GB); Ole Gunnar Dahlhaug, Trondheim (NO); Per Olav Haarberg, Trondheim (NO)

(73) Assignee: Chapdrive AS, Trondheim (NO)

( * ) Notice: Subject to any disclaimer, the term of this patent is extended or adjusted under 35 U.S.C. 154(b) by 421 days.

(21) Appl. No.: 11/921,659

(22) PCT Filed: Oct. 31, 2006

(86) PCT No.: PCT/NO2006/000390

§ 371 (c)(1),
(2), (4) Date: Apr. 4, 2008

(87) PCT Pub. No.: WO2007/053036

PCT Pub. Date: May 10, 2007

(65) Prior Publication Data

US 2009/0140522 A1 Jun. 4, 2009

(30) Foreign Application Priority Data

Oct. 31, 2005 (NO) .................................. 20055038
Oct. 31, 2006 (NO) .................................. 20064996

(51) Int. Cl.
F03B 13/00 (2006.01)
H02P 9/04 (2006.01)
F03D 9/00 (2006.01)
F03B 13/10 (2006.01)

(52) U.S. Cl. .............................. 290/54; 290/43; 290/44; 290/55; 60/398; 91/275; 126/247

(58) Field of Classification Search ................... 290/43, 290/44, 54, 55; 60/398; 91/275; 126/247
See application file for complete search history.

(56) References Cited

U.S. PATENT DOCUMENTS 2,539,862 A * 1/1951 Rushing ....................... 62/230

(Continued)

FOREIGN PATENT DOCUMENTS

DE 19626793 C1 * 6/1997

(Continued)

*Primary Examiner*—T C Patel
*Assistant Examiner*—Pedro J Cuevas
(74) *Attorney, Agent, or Firm*—Birch, Stewart, Kolasch & Birch, LLP

(57) ABSTRACT

A turbine (2) driven electric power production system (1),—said turbine (2) arranged for being driven by a fluid (3) having a fluid speed (v) varying in time,—said turbine (2) connected to a hydrostatic displacement pump (6) further connected to a hydrostatic displacement motor (8) as part of a closed loop hydrostatic transmission system (7),—said motor (8) arranged for driving an electrical generator (9) supplying AC power (10) at a frequency ($f_g$) near a given desired frequency ($f_{des}$), characterized by a closed loop system arranged for controlling a volumetric displacement (13) of the hydrostatic motor (8), comprising—a fluid speed meter (11m) arranged for producing a speed signal (11s) representing a speed (v) of said fluid (3), and—a rotational speed meter (12m) arranged for providing a rotational speed signal (12s) representing a rotational speed measurement (ω) of said turbine (2), —a motor displacement control system (15) for continuously receiving said speed signal (11s) and said rotational speed signal (12s) and arranged for calculating a control signal (16), —a volumetric displacement control actuator (17) on said hydrostatic motor, arranged for receiving said control signal (16) for continuously adjusting a volumetric displacement (d) of said hydrostatic motor (8) for maintaining a set turbine tip speed ratio ($tsr_{set}$) and thereby providing an improved power efficiency of the power production system (1) during fluctuations in said fluid speed (v).

11 Claims, 11 Drawing Sheets

Power production system with an asyncronous generator connected to a local power consuming system with available reactive power, or connected a stiff grid.

U.S. PATENT DOCUMENTS

| | | | | |
|---|---|---|---|---|
| 3,806,733 A * | 4/1974 | Haanen | | 290/55 |
| 3,952,723 A * | 4/1976 | Browning | | 126/247 |
| 4,031,702 A * | 6/1977 | Burnett et al. | | 60/398 |
| 4,055,950 A * | 11/1977 | Grossman | | 60/398 |
| 4,149,092 A * | 4/1979 | Cros | | 290/54 |
| 4,206,608 A * | 6/1980 | Bell | | 60/698 |
| 4,229,661 A * | 10/1980 | Mead et al. | | 290/44 |
| 4,274,010 A * | 6/1981 | Lawson-Tancred | | 290/55 |
| 4,280,061 A | 7/1981 | Lawson-Tancred et al. | | 290/55 |
| 4,309,152 A * | 1/1982 | Hagen | | 417/218 |
| 4,447,738 A * | 5/1984 | Allison | | 290/44 |
| 4,496,846 A * | 1/1985 | Parkins | | 290/44 |
| 4,496,847 A * | 1/1985 | Parkins | | 290/44 |
| 4,498,017 A * | 2/1985 | Parkins | | 290/44 |
| 4,503,673 A * | 3/1985 | Schachle et al. | | 60/398 |
| 4,563,939 A * | 1/1986 | Siegrist | | 91/275 |
| 4,622,473 A | 11/1986 | Curry | | 290/53 |
| 5,868,161 A * | 2/1999 | Asbrand et al. | | 137/498 |
| 6,379,119 B1 * | 4/2002 | Truninger | | 417/22 |
| 6,647,719 B2 * | 11/2003 | Truninger | | 60/414 |
| 6,748,737 B2 * | 6/2004 | Lafferty | | 60/398 |
| 6,911,743 B2 | 6/2005 | Ishizaki et al. | | 290/55 |
| 7,183,664 B2 * | 2/2007 | McClintic | | 290/55 |
| 7,259,471 B2 * | 8/2007 | Basteck | | 290/43 |
| 7,418,820 B2 * | 9/2008 | Harvey et al. | | 60/487 |
| 7,436,086 B2 * | 10/2008 | McClintic | | 290/55 |
| 7,485,979 B1 * | 2/2009 | Staalesen | | 290/44 |
| 7,569,943 B2 * | 8/2009 | Kovach et al. | | 290/44 |
| 7,656,055 B2 * | 2/2010 | Torres et al. | | 290/55 |
| 2002/0112476 A1 * | 8/2002 | Truninger | | 60/476 |
| 2005/0146141 A1 * | 7/2005 | Basteck | | 290/44 |
| 2005/0155346 A1 * | 7/2005 | Nikolaus | | 60/398 |
| 2005/0194787 A1 | 9/2005 | Tilscher et al. | | 290/8 |
| 2006/0138780 A1 * | 6/2006 | Flamang et al. | | 290/55 |
| 2007/0007769 A1 * | 1/2007 | Basteck | | 290/1 C |
| 2008/0296897 A1 * | 12/2008 | Kovach et al. | | 290/44 |

FOREIGN PATENT DOCUMENTS

| | | |
|---|---|---|
| EP | 0 097 002 A2 | 12/1983 |
| FR | 2 755 473 A1 | 5/1998 |
| JP | 11-287178 A | 10/1999 |
| WO | WO 94/19605 A1 | 9/1994 |
| WO | WO 99/07996 A1 | 2/1999 |
| WO | WO 03/098037 A1 | 11/2003 |

* cited by examiner

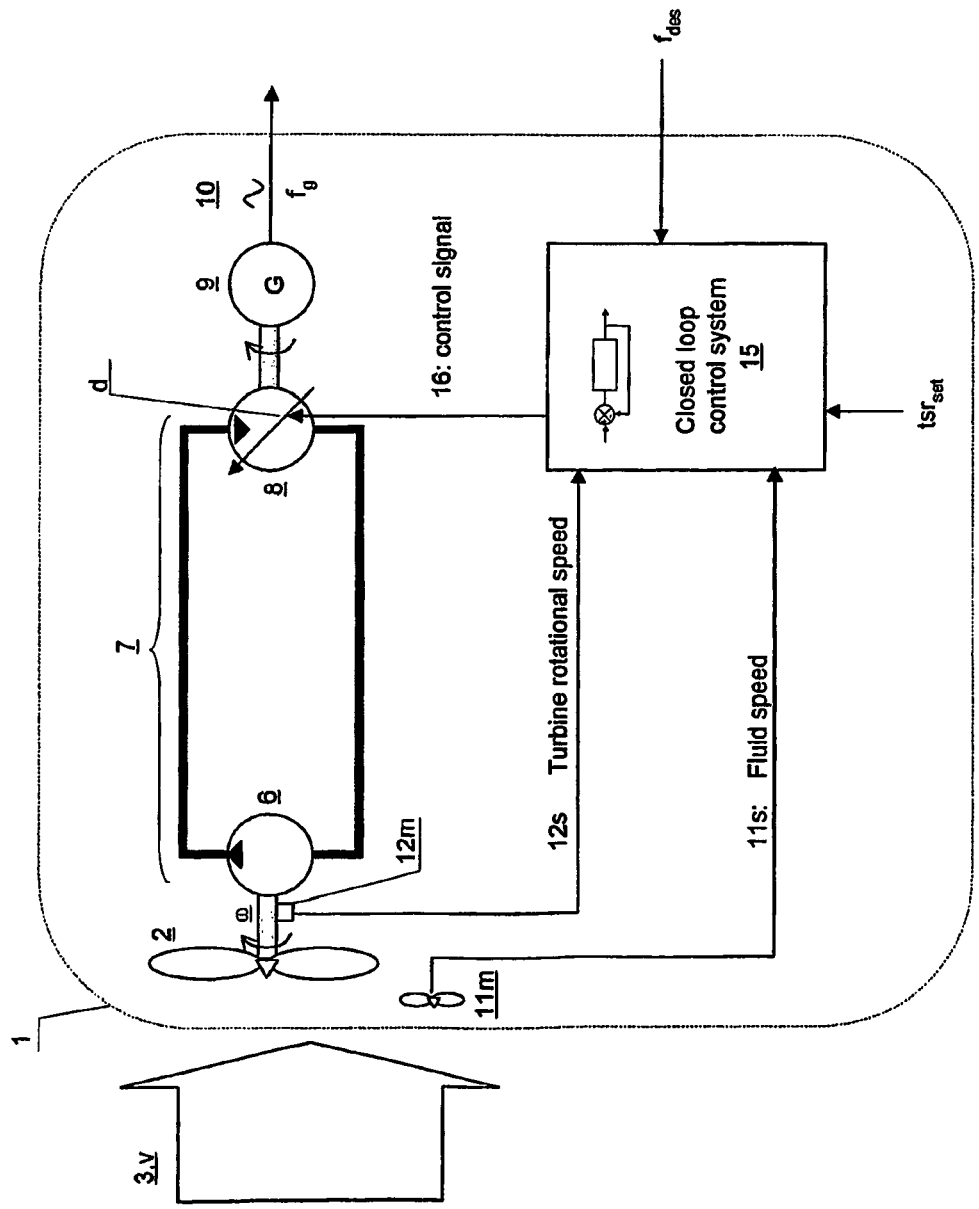
Fig. 1 General illustration of the invention

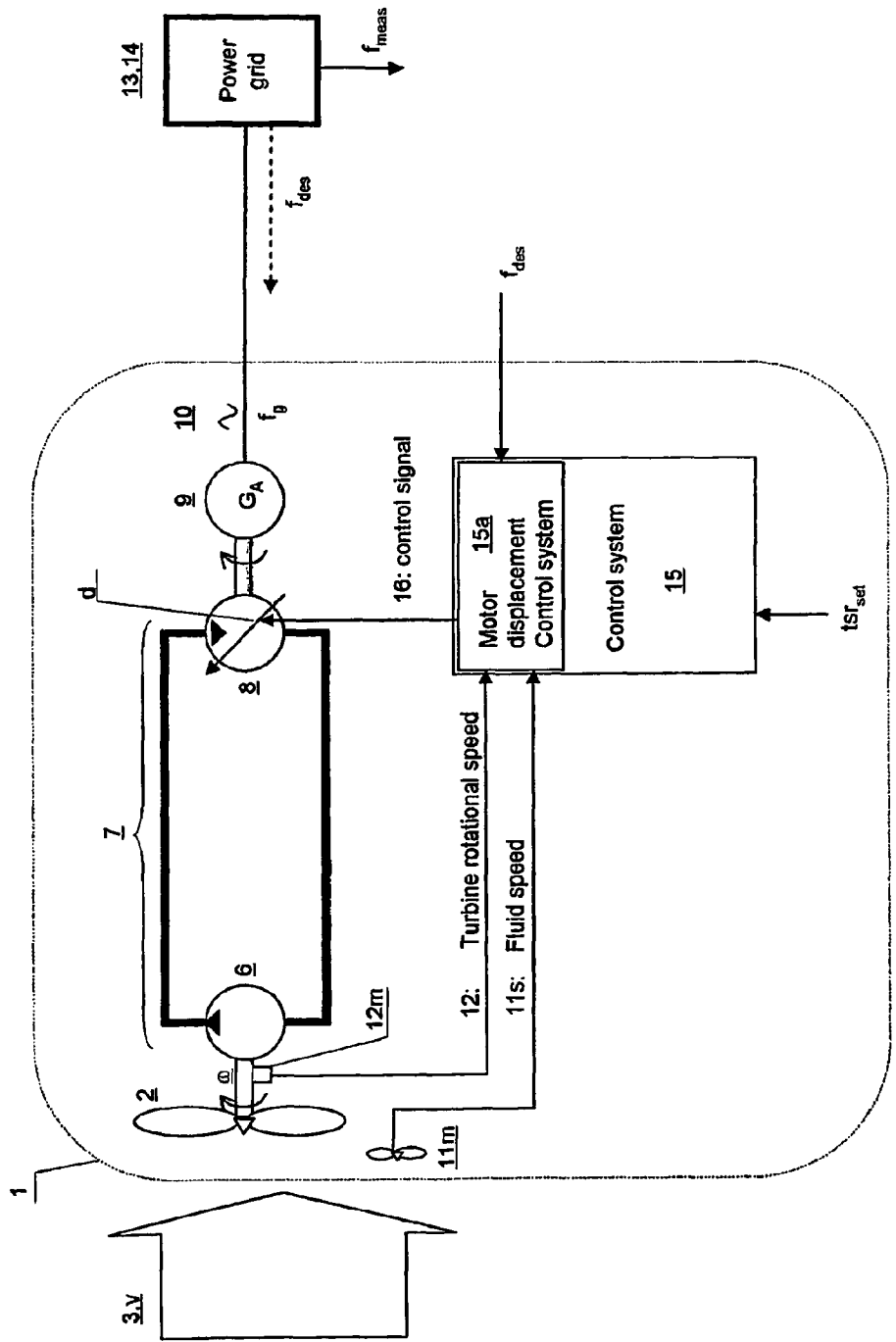
*Fig. 2 Power production system with an asyncronous generator connected to a local power consuming system with available reactive power, or connected a stiff grid.*

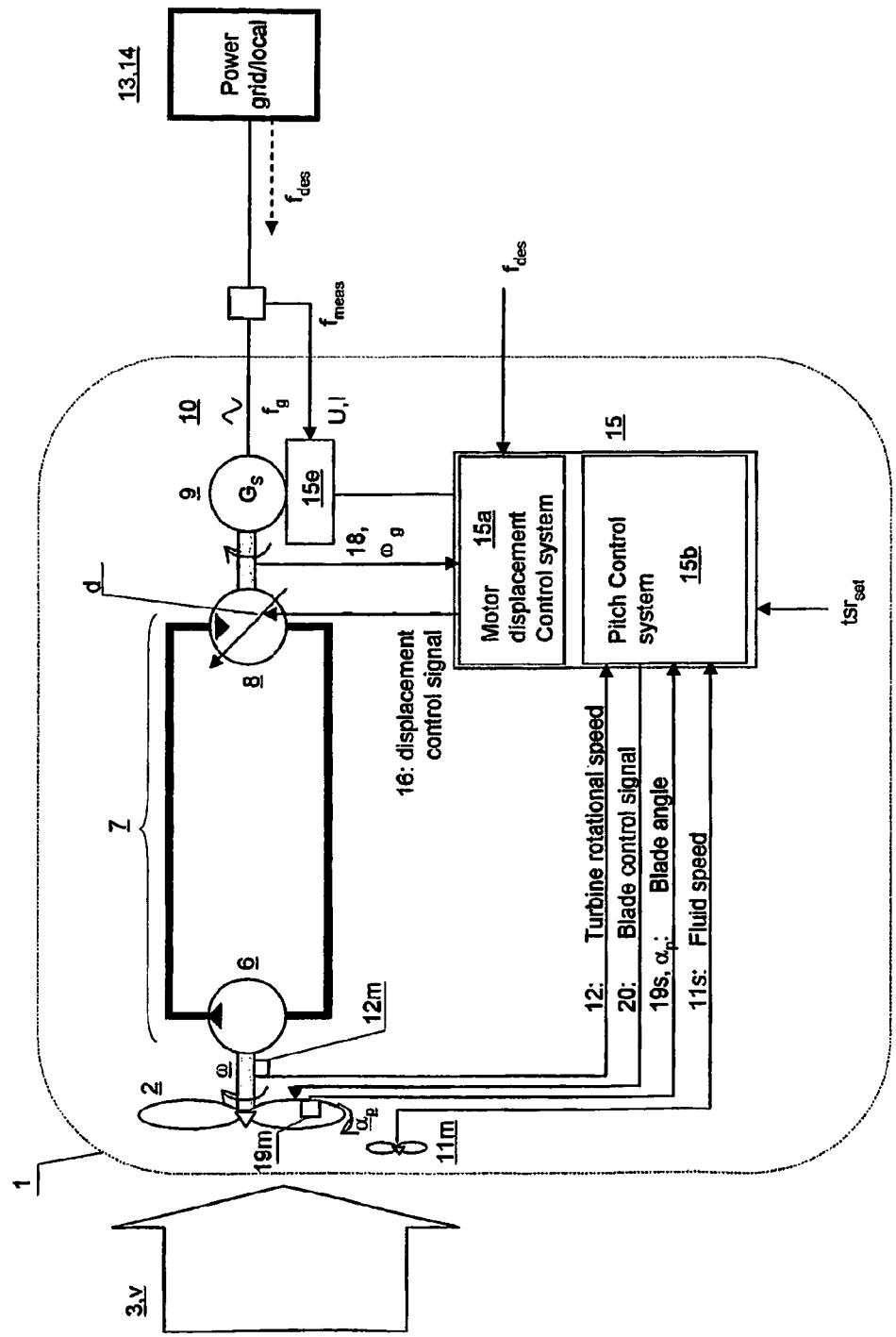
Fig. 3 Power production system with syncronous generator connected to a local power consuming system or a stiff grid

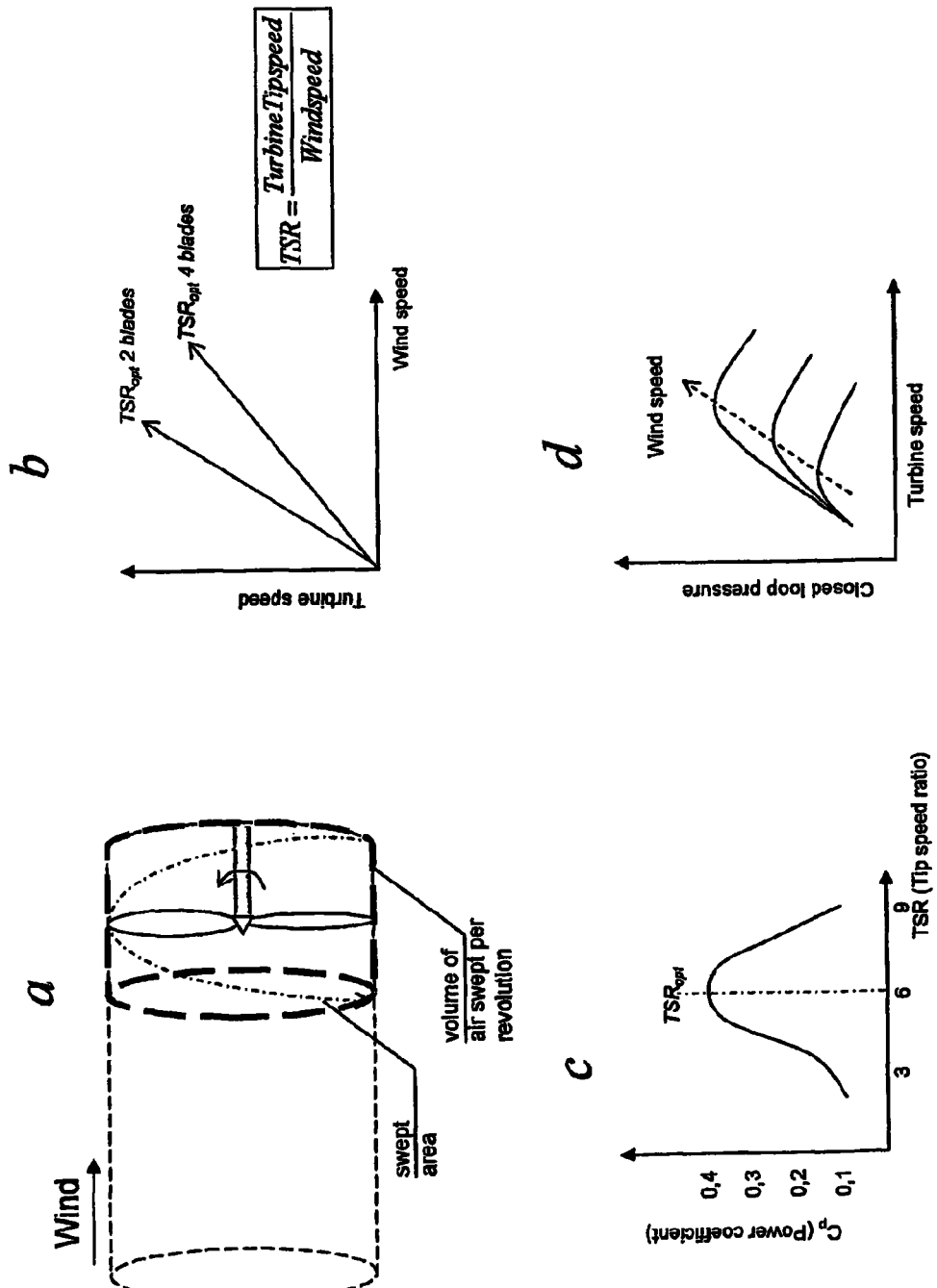
Fig. 4 Optimising the efficiency of a wind turbine based on a controlled tip speed ratio.

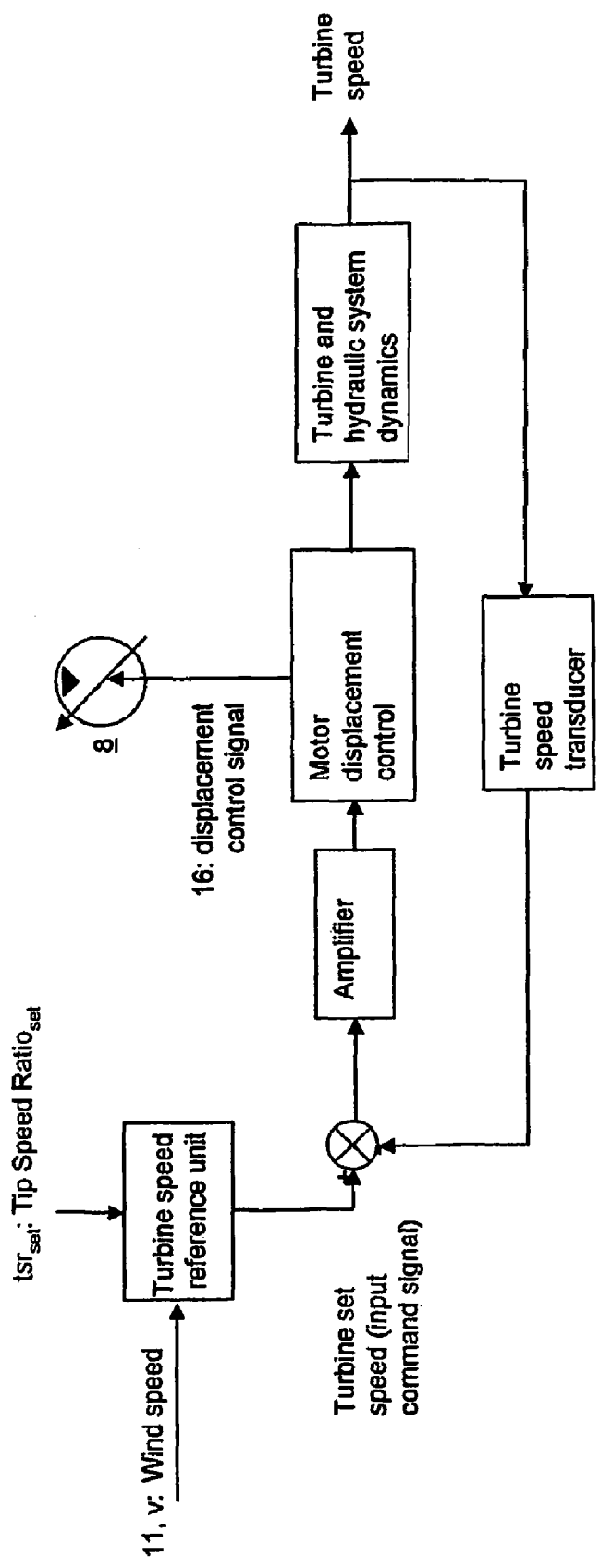
Fig. 5 Servo control system for turbine speed

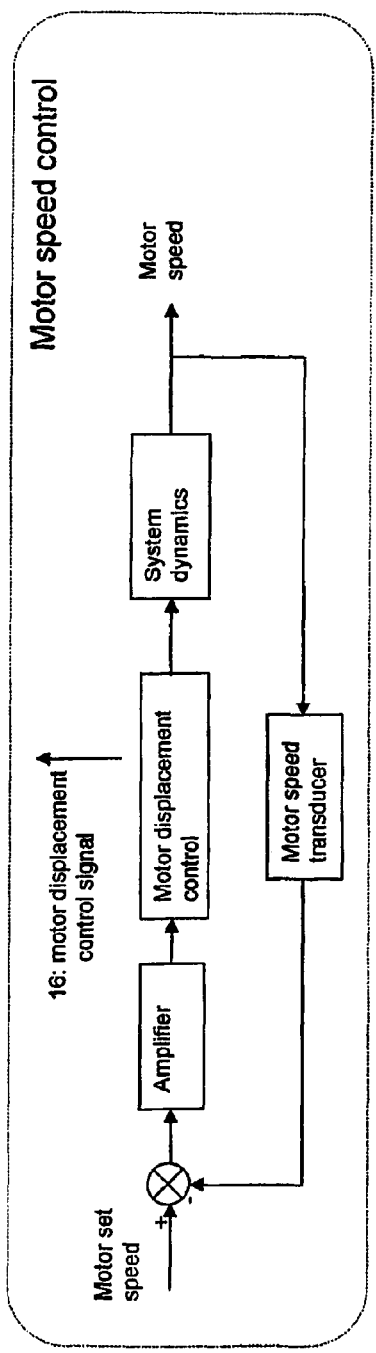
*Fig. 6a: Without pitch control in system where motor speed is controlled.*

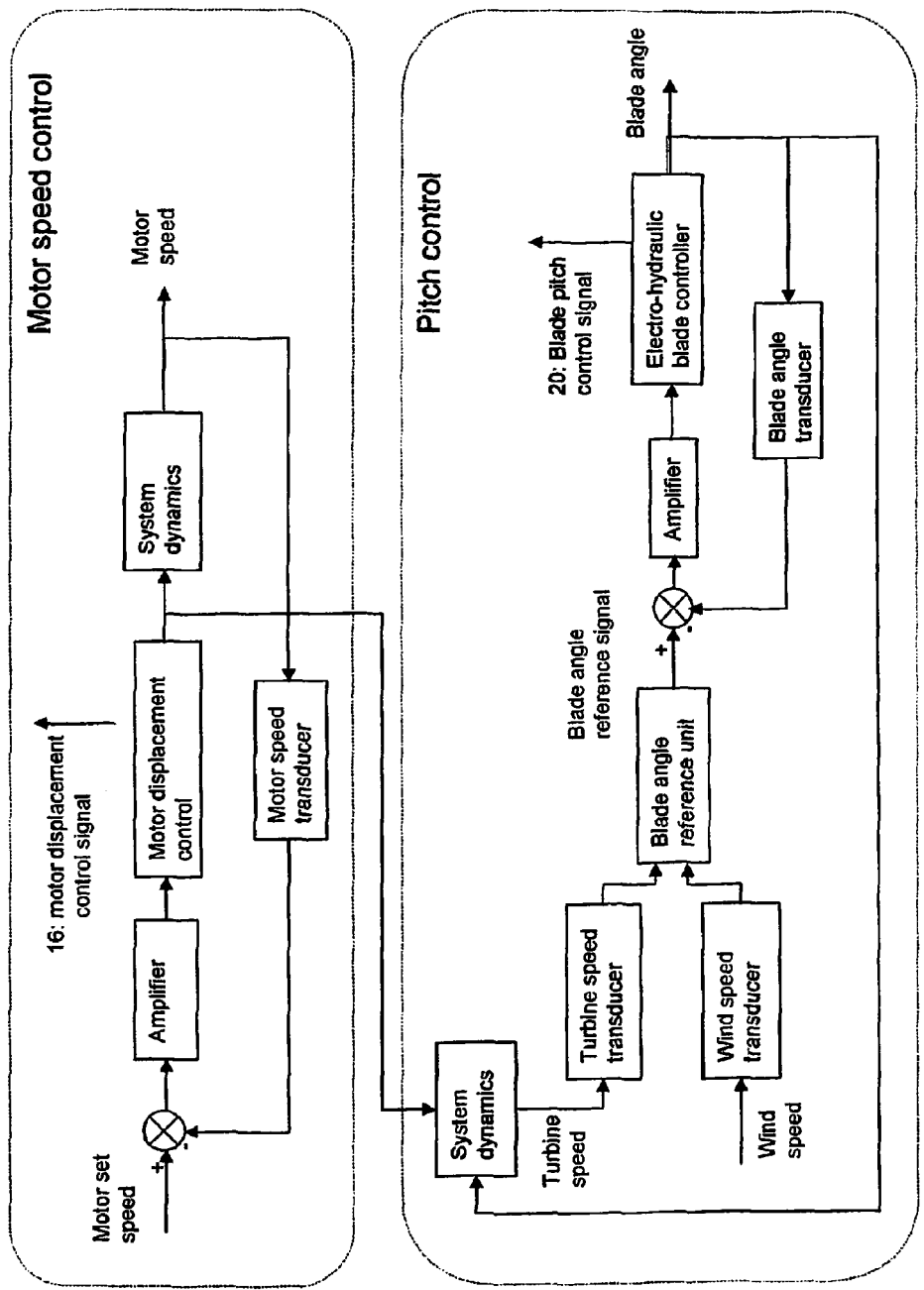
*Fig. 6b: Integrated pitch control in system where motor speed is controlled.*

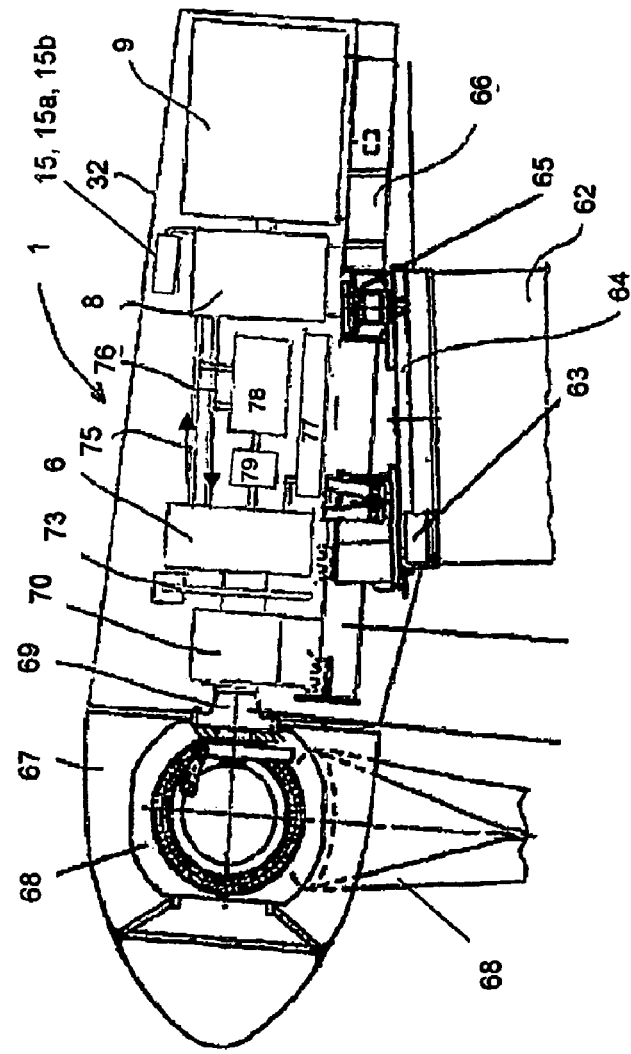
Fig. 7 Vertical section of a wind turbine power poduction system

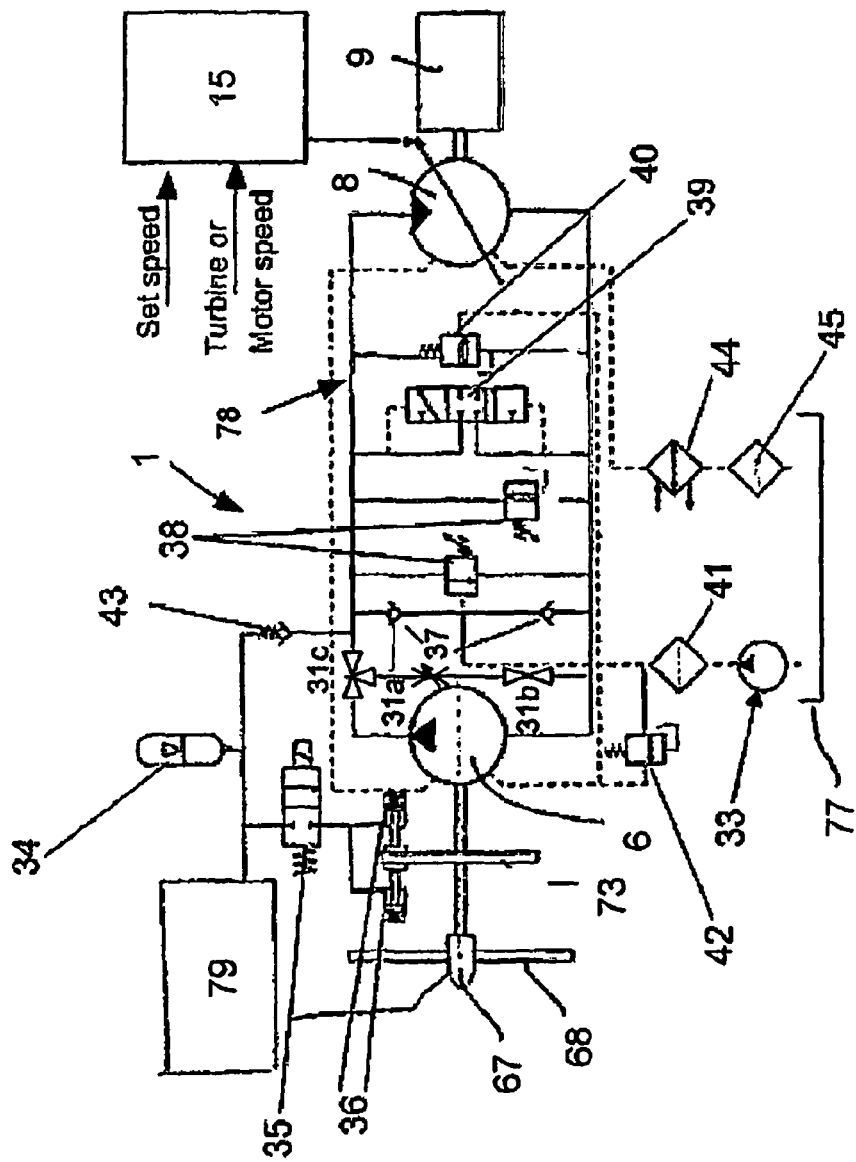
Fig. 8: *Basic hydrostatic power transmission circuit*

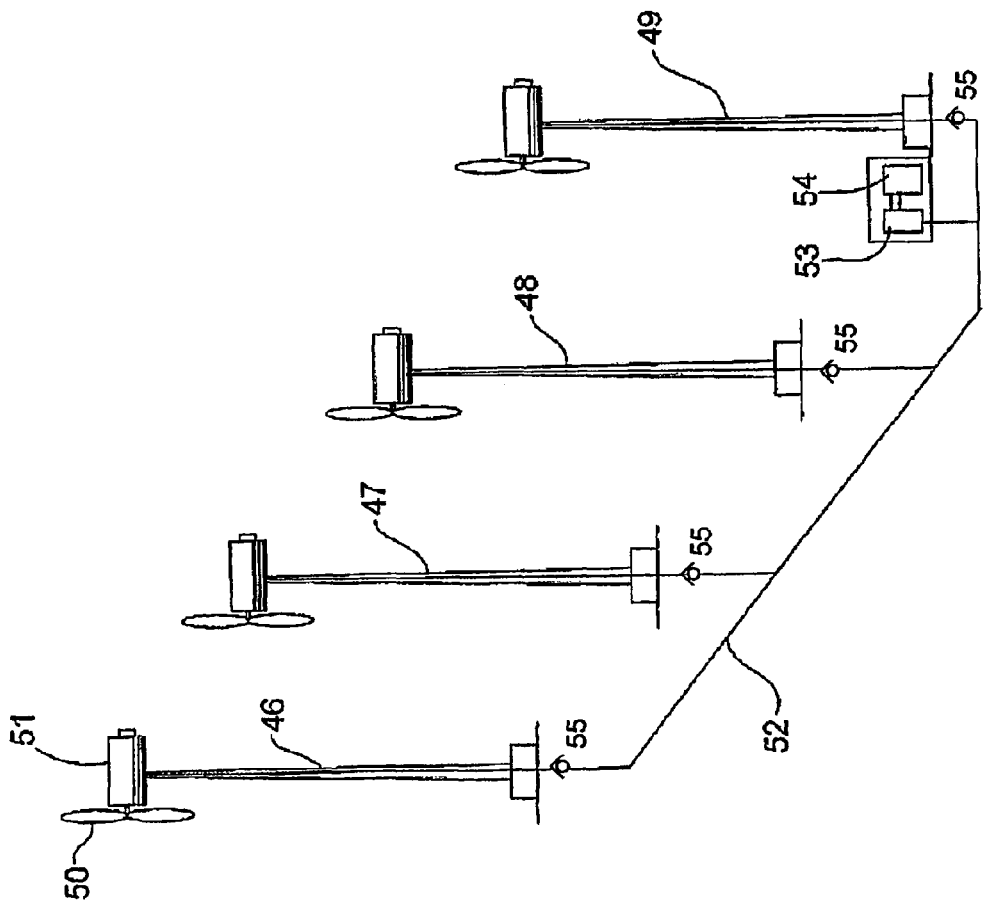
Fig. 9 multiple wind turbine units powering one single hydraulic motor and generator assembly situated on the ground

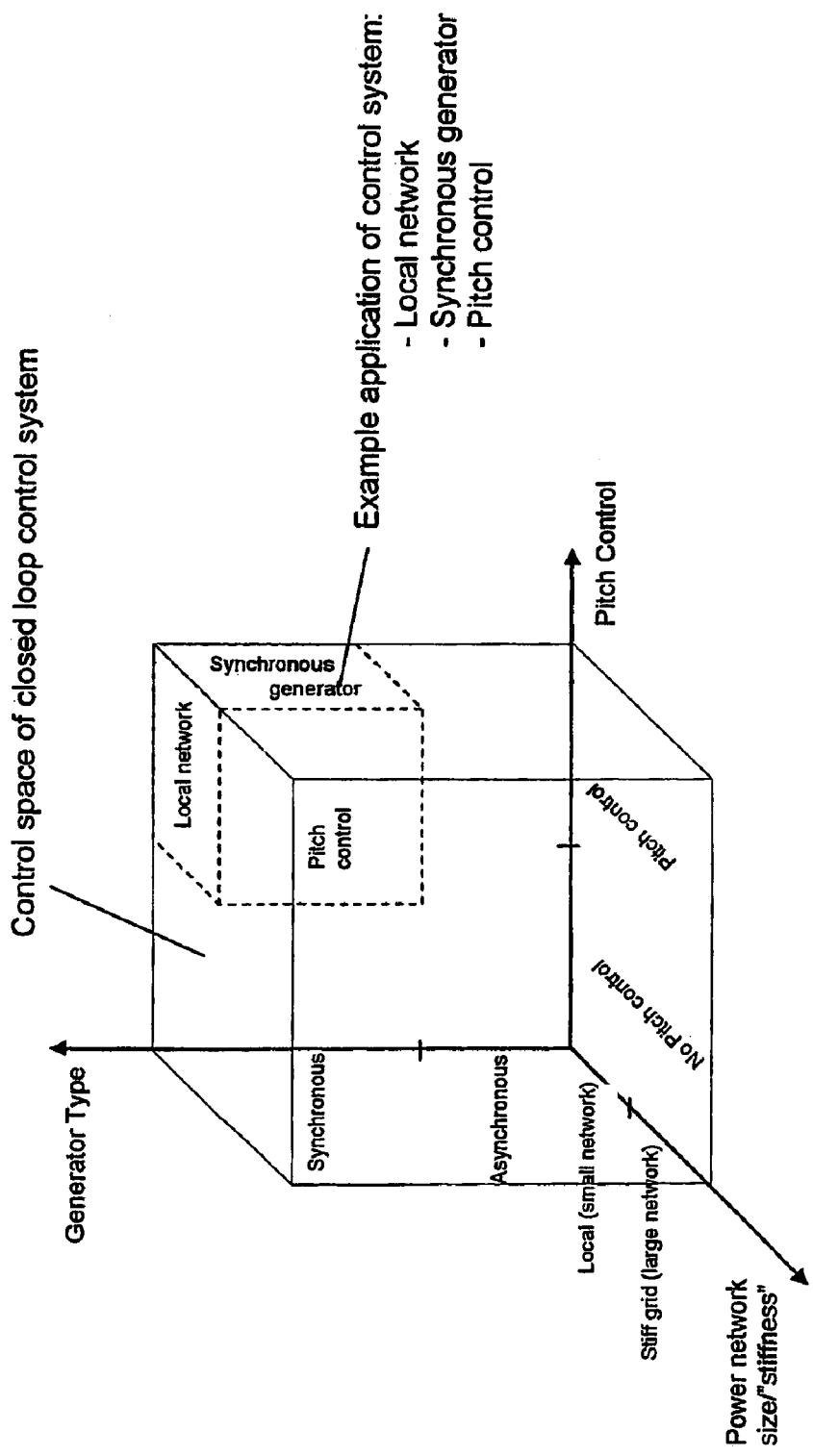
Fig. 10 Control system versatility

TURBINE DRIVEN ELECTRIC POWER PRODUCTION SYSTEM AND A METHOD FOR CONTROL THEREOF

TECHNICAL FIELD

The invention relates to a turbine driven electric power production system and a system for control thereof. More specifically, the invention relates to an electric power production system in which a turbine is driven by a fluid of which the fluid speed is varying in time, the turbine driving a hydrostatic displacement pump connected to a hydrostatic displacement motor in a hydrostatic transmission system, the motor further driving an electrical generator supplying AC power at a frequency near a given desired frequency. Fluid speed measurements, turbine speed measurements and hydrostatic motor or generator speed measurements may be used as input to a motor displacement control system for calculating a control signal, for controlling a volumetric displacement of the hydrostatic motor.

BACKGROUND ART

Conventionally the power from wind turbine systems is transferred mechanically, either directly or by a rotational speed changing gearbox to a generator. The generator can be connected to the electric grid or net so that it is forced to rotate at a synchronous frequency and thus a fixed speed, incurring that the generator will act as a motor if the turbine is not supplying an appropriate level of mechanical torque and power, and thus the net may drive the generator and turbine through the gearbox. It is known in the background art that the angle of the turbine blades can be varied by a hydraulic system to either obtain maximum power from the turbine at a given wind speed or limit the power to a desired level if the wind speed is above a design limit. As the turbine speed is kept constant by the generator the blade angle can be varied in order to maintain maximum efficiency and hence maximum power output from the turbine over a range of wind speeds. A disadvantage with controlling the generator speed by adjusting the pitch is the fact that the response time of the system's adaptation to changing wind speeds may be slow.

Wind and water turbines are currently important devices for generating energy. As a consequence of the deficiencies of prior art hydraulic transmissions for wind power plants, one state of the art in designing such plants, is the use of a turbine generator assembly with a high ratio gearbox (gearbox) at the top of the turbine tower. This design introduces a series of structural challenges, which has limited the size and output of the plants and impaired the efficiency. The use of gearboxes has increased the weight and the costs and the noise associated with wind power plants. Further, it has enforced the use of single unit plant, thus increasing the costs and the weight of each unit.

An alternative method for transmitting the turbine power uses a hydrostatic transmission system consisting of a hydraulic pump and a hydraulic motor. The hydraulic pump is driven by the turbine which supplies flow to a hydraulic motor that is connected to the generator. The appropriate selection of the pump and motor displacements provides the desired speed ratio between the turbine and the generator and using a variable motor displacement allows the speed ratio to be varied.

In U.S. Pat. No. 4,503,673 (Schachles, 1979) the hydraulic pressure generated by the turbine pump is sensed and compared with a datum value that is varied with the velocity of the wind. If the pressure is lower than the set value, the motor displacement is increased, thus increasing the turbine speed until the actual pressure and the set pressure are equal. Thus as the wind speed is increased, so the turbine speed increases in the way that the datum value is varied with the wind velocity in order to create a constant tip speed ratio (TSR).

There are some advantages of measuring the turbine rotational speed and using this as an input to a control system according to the invention when compared to the system using pressure measurements for controlling the generator speed as described in U.S. Pat. No. 4,503,673. The advantages include:

Improved accuracy of the operating point for maximum efficiency. This is because of the low rate of variation in the hydraulic pressure with changes in turbine speed, for a given wind speed, which could cause uncertainty in its operation. It is also likely that the graphical relationship is concave upwards which could worsen this problem. Using turbine speed control the speed that creates maximum turbine efficiency can be more precisely defined.

As a result of a) and also because of the way in which the hydraulic pressure arises in the system, it is likely that there would be problems in providing an acceptable dynamic response for a pressure control system. In this event and to avoid instability, the value of system controller gain would have to be set at a level that would further compromise its steady-state accuracy.

Various power plants with one or more power units have been proposed with a hydraulic transmission between the power unit(s) and an electric generator. The one or more power units may be wind turbines, water turbines, e.g. for tidal power plants or wave power plants. Such transmissions will allow multiple driving units to operate one hydraulic motor connected to an electric generator, a pump or another working machine.

Wind power plants with a wind turbine powering a hydraulic pump with a transmission to a hydraulic motor have long been known.

In German patent publication 30 25 563 (Calzoni 1980) a hydraulic transmission for wind power plants is proposed, where the starting is controlled manually by a shunt valve and the maximum operating pressure is limited by a pressure control valve. No control is provided for maintaining a fixed hydraulic motor speed or optimising the operation of the turbine.

Japanese patent application 61212674 (Matsushita Seiko 1986) describes a wind power plant with a hydraulic pump and electric generator assembly arranged at the foundation of the wind turbine tower.

WIPO-publication WO 94/19605 (Gelhard 1994) describes a wind power plant with multiple turbine units which can be connected to operate one hydraulic motor generator assembly arranged at the foundation of one of the units.

From U.S. Pat. No. 4,503,673 (Schachle et al 1985) a wind power plant is known to be connected to a hydraulic pump and a variable displacement motor connected to drive an electric generator. When operating at a constant speed the flow to the motor is proportional to its displacement. For the speed of the turbine to increase, the displacement of the motor must increase to permit an increase in the flow rate through the motor.

WIPO-publication WO 03/098037 (MLH Global 2003) describes a wind turbine with a variable displacement, pressure compensated hydrostatic transmission. A major objective of this device is to control "overrunning" loads. For this purpose, means for varying the displacement of the transmission in response to the variations in pressure within the oil circuit is proposed. The proposed displacement control is operating during the start up and not for being used during normal operation.

In connection with wind turbines operating an electric generator at a fixed speed ratio, various wind turbine pitch control systems are known. In WIPO-publication WO 99/07996 such a control system is described, which is not suitable for a hydraulic transmission.

From U.S. Pat. No. 4,622,473 (Curry, 1986) it is known to let a multitude of wave operated hydraulic pumps power a hydraulic motor, which in turn powers an electric generator. This system has no hydraulic control system for maintaining any particular frequency.

French patent application FR-2755473 describes a hydraulic transmission system for use in wind turbines. The transmission is controlled by a closed loop servo system which has a speed detector measuring the rotational speed of the generator, and a regulator receiving the output from this detector and using it to control the angle of inclination of the plate in the variable flow pump. The control system does not measure turbine rotational speed or wind speed, and cannot be used for improving efficiency based on an optimised tip speed ratio.

US patent application US2005/0194787A1 describes a control system with three control levels for a wind power plant with a hydrodynamic gear where the wind power plant is connected to an electric grid. A controller controls an angular position of the rotor blades and/or controls a setting of the reaction member of the hydrodynamic speed transformer and/or controls the power electronics of the generator. The controller is provided with predetermined setpoint characteristics depending on operating states of the wind power plant and/or the electric grid or characteristics of the wind. The power transmission as such is a mechanical gear.

PROBLEMS TO BE SOLVED

For any turbine, it is not possible to convert all kinetic energy in the wind to shaft power since wind must be able to exit the turbine. The theoretical maximum power that could be obtained in a turbine relative to the kinetic energy in the moving wind mass is the so-called Betz limit: Cp_max=0.59 as is known by a person skilled in the art. This is illustrated in FIG. 4a in which an imagined wind volume cylinder moving with the speed of the wind, blowing through a rotating propeller of a wind turbine. The circle described by the rotating wing tip is the area swept by the turbine, and the length of the cylinder of air passing the turbine in one revolution of the turbine is indicated. When the wind speed increases the imagined cylinder moves faster towards the turbine and the turbine rotational speed or pitch angle must change in order to exploit all the energy of the moving wind mass. The ratio between the turbine tip speed and the wind speed is the so-called the tip speed ratio (TSR). The optimised tip speed ratio is a linear relationship between turbine speed and wind as can be seen in FIG. 4b. The optimised tip speed ratio will vary with the design of the turbine. A turbine with 4 blades will typically have a lower optimised tip speed ratio than a turbine with 2 blades. In FIG. 4c a graph of the power coefficient Cp versus TSR, the tip speed ratio for a given turbine design, is illustrated. The power coefficient Cp for the illustrated example has a maximum Cp of about 0.4 for a TSR value of about 6. If the turbine is made to run slower, i.e. if the tip speed ratio is decreased, the power coefficient is reduced. Likewise, if the turbine runs too fast, i.e. if the tip speed ratio is increased, the power coefficient will also decrease. Thus, it is important to keep the tip speed ratio very close to the value that gives the maximum power coefficient at the top of the curve. This can also be seen by examining how the hydraulic pressure in the closed loop varies as a function of turbine rotational speed and wind speed. This is shown in FIG. 4d where increased wind speed should result in increased turbine speed to maximize closed loop pressure. However, the maximum turbine efficiency does not necessarily coincide with maximum hydraulic pressure.

Thus the rotational speed allowed for the turbine should be adjusted according to changes in the wind speed by changing the hydrostatic displacement of the motor relative to the hydrostatic displacement of the turbine pump, leaving the motor and generator running at a revolution speed providing the desired power frequency.

The generator must in the most common power production systems operate at a given frequency, a frequency being either controlled by the grid to which the generator provides power, or by the characteristics of the power consuming system to which the power is furnished. In the proposed system the motor displacement forms part of a closed loop hydraulic control system so that when the turbine speed differs from that of a set value, the difference between the speed values will cause the motor displacement to be changed until the generator is operating at a speed close to the set value. Further, by varying the turbine pitch as a function of the wind speed the turbine can be set so as to obtain maximum efficiency even when the hydrostatic motor and generator is forced to run at the desired speed and thus frequency.

An important problem to be solved is the actual placement of the main weight of the power producing system in a wind power system. The arranging of the generator away from the top portion of the mast in a wind power system will remove a large proportion of the weight away from the top portion of the mast, and down to the ground. The arranging of the generator on ground level will further ease the supervision and maintenance of said generator. to allow the placement of the generator away from the turbine, power transmission means such as a hydrostatic transmission system must be used. The use of a hydrostatic transmission to transfer the power generated by a wind turbine has been proposed in several patent publications, as has been the arrangement of the motor/generator unit on the ground, remotely from the turbine. However, the proposed systems suffer from many shortcomings as is described in the background art.

Further, the invention addresses the problem of speed control of the motor when the generator is stand-alone, connected to a variable power consumption and not synchronized to a large grid.

The invention further provides a closed loop speed control of both the turbine and the motor and hence the generator when the generator is not connected to the electric grid.

SHORT SUMMARY OF THE INVENTION

A solution according to the invention for remedying the above-mentioned problems is a turbine driven electric power production system, comprising a turbine arranged for being driven by a fluid having a fluid speed v varying in time, said turbine connected to a hydrostatic displacement pump further connected to a hydrostatic displacement motor as part of a hydrostatic transmission system, with the motor arranged for driving an electrical generator supplying AC power at a frequency $f_g$ near a given desired frequency $f_{des}$. A novel feature of the system according to the invention is a closed loop control system arranged for using one or more speed measurements as input for continuously calculating a control signal for a volumetric displacement control actuator acting on said hydrostatic motor arranged for continuously adjusting a volumetric displacement d of the hydrostatic motor.

According to an advantageous embodiment of the invention, the electric power production system further comprises that the closed loop control system is arranged for continuously receiving a speed signal representing the speed v of the fluid from a fluid speed meter, and continuously receiving a turbine rotational speed signal representing the rotational speed measurement ω of the turbine 2, from a turbine rotational speed sensor 12*m*. Based on said wind speed and turbine rotational speed signals, a control signal (16) is calculated for a volumetric displacement control actuator 17 on the hydrostatic motor for continuously adjusting the volumetric displacement d of the hydrostatic motor 8.

According to the invention the system may thus be used to maintain a set turbine tip speed ratio and thereby achieving an improved power efficiency of the power production system during fluctuations in said fluid speed v.

There are some advantages of measuring the turbine rotational speed and using this as an input to a control system according to the invention when compared to the system using pressure measurements for controlling the generator speed such as described in U.S. Pat. No. 4,503,673. The advantages include improved accuracy of the operating point for maximum efficiency. This is because of the low rate of variation in the hydraulic pressure with changes in turbine speed, for a given wind speed, which could cause uncertainty in its operation. It is also likely that the graphical relationship is concave upwards which could worsen this problem. Using turbine speed control the speed that creates maximum turbine efficiency can be more precisely defined. As a result of the above, and also because of the way in which the hydraulic pressure arises in the system, it is likely that there would be problems in providing an acceptable dynamic response for a pressure control system. In this event and to avoid instability, the value of system controller gain would have to be set at a level that would further compromise its steady-state accuracy.

BRIEF DESCRIPTION OF THE DRAWINGS

The described figures are for illustration purposes only and shall not be construed as limiting the invention which shall only be limited by the claims.

FIG. 1 illustrates an electric power production system (1) according to the invention in which a turbine (2) is driven by a fluid having a fluid speed (v) varying in time, the turbine (2) driving a hydrostatic displacement pump (6) connected to a hydrostatic displacement motor (8) in a hydrostatic transmission system (7), the motor (8) driving an electrical generator (9) supplying AC power (10) at a frequency ($f_g$) near a given desired frequency ($f_{des}$). Fluid speed measurements (v) and turbine speed measurements (ω) may be used as inputs to a motor displacement control system (15) for calculating a control signal (16), for controlling a volumetric displacement (d) of the hydrostatic motor (8).

FIG. 2 illustrates a preferred embodiment of the invention comprising varying the volumetric displacement (d) of the hydrostatic motor (8) in a system of which the electrical generator (9) is connected to an electric grid (14) or a local grid (13) with reactive power available. The generator (9) is here an asynchronous generator.

FIG. 3 illustrates another preferred embodiment of the invention comprising varying the volumetric displacement (d) of the hydrostatic motor (8) in a system of which the electrical generator (9) is connected to a major, stiff grid, or to a local power consumption system (13). The generator (9) is here a synchronous generator. The given desired frequency ($f_{des}$) is a measured frequency ($f_{meas}$) of an electric grid (14) or required frequency ($f_{local}$) of the local power consumption system (13) for controlling the generator (9) to operate at the required frequency ($f_{local}$). The measurements are furnished to a control system (15) arranged for controlling the generator (9) to operate at the frequency of the electric grid (14).

In such an alternative preferred embodiment, the generator may be the only generator in the electrical circuit, and the electrical appliances connected to the circuit requiring a more or less fixed frequency such as 50 Hz or 60 Hz just to operate correctly, which is normally the case for AC appliances.

The synchronous generator (9*s*) is fed by an excitation circuit (15*e*). The excitations circuit can be used for improving the stability of the output voltage and frequency that would else suffer from variations in the generator rotational speed.

The excitation circuit may be interworking with the control system (15) to further enhance the quality of the generated output power and the total operating characteristics of the power production system.

An advantage of using a synchronous generator, is that the synchronous generator (9*s*) can act like a capacitor in the network by changing the parameters of the excitation circuit (15*e*). In this way the synchronous generator can improve the poor phase angle caused by local industry or other asynchronous generators or motors in the network, such as other wind turbines using asynchronous generators for power production.

FIG. 4 illustrates, in several interrelated drawings and graphs, some aspects around why a turbine-driven electrical power production system should respond to changes in wind speed and turbine speed.

FIG. 4*a* illustrates an imagined air cylinder moving with the speed of the wind and blowing through a rotating propeller of a wind turbine. The circle described by the rotating wing tip envelopes the area swept by the turbine, and a length of the cylinder of air passing the turbine in one revolution of the turbine is indicated. When the wind speed increases the imagined cylinder is moving faster towards the turbine and the turbine rotational speed must increase to exploit all the energy of the moving wind mass.

FIG. 4*b* illustrates the ratio between the turbine tip speed and the wind speed. This is the so-called the tip speed ratio (TSR). The optimised tip speed ratio ($TSR_{opt}$) is a linear relationship between turbine speed and wind speed for a given turbine design. It is shown that a turbine with 2 blades should rotate faster than a 4 bladed turbine, given that the blade design of the two turbines are comparable, to exploit maximum energy from the wind.

FIG. 4*c* illustrates a graph of the power coefficient Cp versus TSR, the tip speed ratio for a given turbine design. It is shown that the power coefficient has a maximum value for the optimised tip speed ratio ($TSR_{opt}$).

FIG. 4*d* illustrates that increased wind speed should result in increased turbine speed to increase the pressure in closed loop hydrostatic system, resulting in increased power output. However, maximum pressure does not necessarily correspond to maximum power.

FIG. 5 illustrates a control loop according to the first preferred embodiment of the invention. The turbine set speed of the control loop is a function of the wind speed and the optimised tip speed ratio ($TSR_{opt}$).

FIG. 6*a* illustrates the control loop for another preferred embodiment of the invention. The upper part of the figure illustrates how the difference between the motor actual speed and motor set speeds will vary the motor displacement until equilibrium conditions are achieved. The control action will provide a controlled motor speed under varying power load conditions on the generator and under varying wind speeds. The motor set speed is calculated from the expected output frequency ($f_{des}$) of the generator (9). This control loop is relevant for controlling the motor speed for use with a synchronous generator and may also be used both for a stiff grid and for local power consumption. The turbine speed will operate on the steep flank of the generator torque versus rotational speed curve and adjust turbine rotational speed according to consumed output power.

FIG. 6b illustrates in addition to FIG. 6a, a lower part which shows that the turbine speed and consequently the efficiency of the power production system will be affected by any motor control actions through the system dynamics. To maximise the efficiency of the entire system, the pitch of the turbine blades may be controlled so as for maintaining the optimised tip speed ratio ($TSR_{opt}$).

FIG. 7 illustrates a vertical section of a wind turbine power plant generally comprising a hydrostatic turbine connected to a hydrostatic motor coupled to an electrical generator, all arranged in a nacelle at the top of a wind turbine tower.

FIG. 8 illustrates a diagram of a hydraulic transmission and control circuit according to a preferred embodiment of the invention.

FIG. 9 illustrates schematically a particular embodiment of the invention of which multiple wind turbine units powering one single hydraulic motor and generator assembly situated on the ground.

FIG. 10 illustrates the versatility of the invention. The control system can control a turbine driven power production system operating in the control space spanned by generator type, the network size and the presence or absence of the use of pitch control.

PREFERRED EMBODIMENTS OF THE INVENTION

The invention comprises a turbine driven electric power production system (1). The turbine (2) is arranged for being driven by a fluid (3), the fluid having a fluid speed (v) varying in time, such as is the case for a wind turbine or a water turbine. In the below specification, only examples comprising wind turbines are discussed, however, as will be evident to a person skilled in the art, the invention equally applies to water driven turbines. The turbine (2) is connected to run a hydrostatic displacement pump (6) further connected to a hydrostatic displacement motor (8) as part of a hydrostatic transmission system (7), please see FIG. 1. The hydrostatic system may be a closed loop hydrostatic system or an open loop hydrostatic system. The hydrostatic motor (8) is arranged to transfer the rotational moment by being connected to the rotation axle of an electrical generator (9) supplying AC power (10). The AC power is usually required to be produced at a frequency ($f_g$) stabilised near a given desired frequency ($f_{des}$).

A novel and advantageous important feature presented by the present invention is a closed loop control system (15,15a) arranged for using one or more speed measurements as input for continuously calculating a control signal (16) for a volumetric displacement control actuator (17) acting on said hydrostatic motor arranged for continuously adjusting a volumetric displacement (d) of said hydrostatic motor (8). The change in displacement will cause the hydraulic fluid flow to be varied, which will ultimately change the turbine speed until the output flow from the pump matches the flow demand of the motor. Several advantages of controlling the volumetric displacement of the hydrostatic motor will be given below.

In a further preferred embodiment of the invention, the closed loop control system (15) is arranged for continuously receiving a speed signal (11) representing the speed (v) of the fluid (3), from a fluid speed meter (11m), for continuously receiving a turbine rotational speed signal (12s) representing the rotational speed measurement ($\omega$) of said turbine (2), from a turbine rotational speed sensor (12m), and arranged for, based on said wind speed and turbine rotational speed signals (11, 12s), to calculate a control signal (16) for a volumetric displacement control actuator (17) on said hydrostatic motor for continuously adjusting a volumetric displacement (d) of the hydrostatic motor (8).

The control system (15) comprises a motor displacement control subsystem (15a).

FIG. 2 illustrates a preferred embodiment of the invention comprising varying the volumetric displacement (d) of the hydrostatic motor (8) in a system of which the electrical generator (9) is connected to an electric grid (14) or a local grid (13) with reactive power available. The generator (9) is here an asynchronous generator.

Further, the hydrostatic transmission system comprises a volumetric displacement control actuator (17) connected to the hydrostatic motor, and arranged for receiving said control signal (16) for continuously adjusting a volumetric displacement (d) of said hydrostatic motor (8). When increasing the volumetric displacement capacity (d) of the hydrostatic motor (8), a higher fluid volume is required to make the motor axle rotate a given angle, and when decreasing the volumetric displacement capacity, a smaller fluid volume is required to make the motor axle turn the same given angle.

The system according to the preferred embodiment of the invention is arranged so as for enabling to maintain a set turbine tip speed ratio ($tsr_{set}$) and thereby achieving an improved power efficiency of the power production system (1) during fluctuations in the fluid speed (v). The set turbine tip speed ratio will vary with the fluid speed.

The use of a hydrostatic transmission system for wind and water turbine power production systems provides some advantages over gear driven, power production systems. In general terms hydraulic units provide a high power to weight ratio which reduces the size, and hence cost of the installation. The number of moving parts in the system may be reduced compared to a traditional mechanical system. Combined with the ability to locate the motor and generator separately from the turbine this would further provide a reduction in the cost of installation and maintenance for both the turbine and tower at the power plant location. Recent development shows that the efficiency factor of hydrostatic transmission systems may be comparable to the efficiency of high speed ratio mechanical transmission systems.

Typically, turbine driven systems use hydraulic pressure for releasing brakes. In a preferred embodiment of the invention the hydraulic transmission system of the plant will also provide hydraulic oil for the brakes and pitch control system where this is required. An alternative for braking the turbine, an emergency shutdown circuit with a controlled or fixed choke and a shutdown valve may be arranged between the outlet and the inlet of the pump.

The reduction in the number of moving parts and the absence of a high ratio mechanical gearbox may significantly reduce the acoustic noise generated from the power production system.

One important feature of the system according to the invention is to produce electric power with a stabilised frequency controlled to be close to a desired frequency at varying wind speeds without the requirement for an additional inverter and/or variable blade angle. The system according to the invention may have a faster and more precise dynamic response to fluctuations in wind velocity than comparable control systems based on hydrostatic pressure measurements because the operation point of the present control system is located at a steep linear function as opposed to operating on the right portion of a parabolic pressure curve according to the background art.

Two main situations may occur, of which both are comprised by the above presented solution. The so-called given desired frequency ($f_{des}$) may be either the frequency ($f_{grid}$) of a large so-called "stiff" grid in which the generator (9) may not significantly affect the grid frequency, or the given desired frequency ($f_{des}$) may alternatively be a required frequency ($f_{local}$) of a local power consumption system having variable power consumption.

Thus in one embodiment of the system according to the invention, the electrical generator (9) is arranged for being connected to an electric grid (14), and the given desired frequency ($f_{des}$) is a frequency ($f_{grid}$) of the electric grid (14) affecting or dominating said frequency ($f_g$) of the electrical generator (9) so as for controlling the generator (9) to operate at the frequency of the electric grid (14).

In another embodiment of the system according to the invention, the electrical generator (9) is connected to a local power consumption system (13) having a frequency affected by the electrical generator (9) supplying AC power (10) at a frequency ($f_g$). The given desired frequency ($f_{des}$) will be a fixed required frequency ($f_{local}$) of the local power consumption system (13).

A main purpose of the system is to maintain a turbine tip speed ratio of the turbine as close as possible to a set turbine tip speed ratio ($tsr_{set}$) and thereby improving the efficiency of the power production system (1) during fluctuations in the wind speed (v), under conditions where the power grid or the local power consuming system is able to absorb the current power production. In this case, it is possible to maximise the torque from the hydrostatic motor on the electric generator and thus increase the available power from the generator when forced to operate at a required generator output frequency, to produce the maximum electrical power at each wind speed. The set turbine tip speed ratio will vary depending on the wind speed, as explained previously. The system is further arranged for adjusting the motor rotational speed so as for the generator to operate near the desired frequency. The adjustment of the motor displacement capacity will further incur changes in the turbine speed. Said in other words, one may state that a purpose of the invention is to allow to maximise the torque from the hydrostatic motor on the electric generator, to produce the maximum electrical power at the continuously varying wind speed if required.

FIG. 3 illustrates another preferred embodiment of the invention comprising the variation of the volumetric displacement (d) of the hydrostatic motor (8) in a system of which the electrical generator (9) is connected to a major, stiff grid, or to a local power consumption system (13). The generator (9) is here a synchronous generator. The given desired frequency ($f_{des}$) is a measured frequency ($f_{meas}$) of an electric grid (14) or required frequency ($f_{local}$) of the local power consumption system (13) for controlling the generator (9) to operate at the required frequency ($f_{local}$). The measurements are furnished to a control system (15) arranged for controlling the motor rotational speed ($\omega_g$) so as for the generator (9) to operate at the frequency of the electric grid (14) or local power consumption system (13). In such an alternative preferred embodiment, the generator may be the only generator in the electrical circuit, and the electrical appliances connected to the circuit requiring a more or less fixed frequency such as 50 Hz or 60 Hz just to operate correctly, which is normally the case for AC appliances.

The synchronous generator (9s) is fed by an excitation circuit (15e). The excitation circuit can be used for improving the stability of the output voltage and frequency that would otherwise suffer from variations in the generator rotational speed. The excitation circuit may be interworking with the control system (15) to further enhance the quality of the generated output power and the total operating characteristics of the power production system.

An advantage of using a synchronous generator, is that the synchronous generator (9s) can act like a capacitor in the network by changing the parameters of the excitation circuit (15e). In this way the synchronous generator can improve the poor phase angle caused by local industry or other asynchronous generators or motors in the network, such as other wind turbines using asynchronous generators for power production.

Stiff Grid

FIG. 2 illustrates a preferred embodiment of the invention comprising varying the volumetric displacement (d) of the hydrostatic motor (8) in a system of which the electrical generator (9) is connected to an electric grid (14) or a local grid (13) with reactive power available. The generator (9) is here an asynchronous generator.

Thus in a system according to an embodiment of the invention, the electrical generator (9) may be arranged for being connected to an electric grid (14), the given desired frequency ($f_{des}$) being a frequency ($f_{grid}$) of the electric grid (14). In other words, the grid (14) is so large that it represents a "stiff" grid unaffected by the generator system. Using an asynchronous generator, the frequency of the grid will affect or dominate the frequency ($f_g$) of the electrical generator (9) so as for effectively controlling or actually forcing the generator (9) to operate at the same frequency as the frequency of the electric grid (14).

If the electrical asynchronous generator (9) is arranged for being connected to a local power consumption system (13) where the local power consumption system comprises a local power generator e.g. powered by a diesel engine, for supplying the asynchronous generator with reactive power. The synchronous diesel generator will in this case govern the frequency of the local power production system, and the asynchronous generator may operate as if arranged in a stiff grid. Thus as an asynchronous generator (9) is forced to operate near the speed with the electric grid (14) the generator (9) will actually control the turbine speed. This would, having a fixed pump/motor fluid capacity, decrease the efficiency of the power generating system as the turbine tip speed ratio would not be optimal. A purpose of this preferred embodiment of the invention is thus to make the turbine operate near an optimum tip speed ratio to allow to maximise the torque from the hydrostatic motor on the electric generator, forced to operate to produce the maximum electrical power at each wind speed, as one may assume that there is no practical limit to the amount of power that may be produced to the grid.

FIG. 5 illustrates a control loop used for optimising the efficiency of the system. The turbine set speed of the control loop is a function of the wind speed and the optimised tip speed ratio ($TSR_{opt}$).

It is further possible to include the use of pitch control in connection with using the motor speed control. Pitch control can also be used to reduce the efficiency of the turbine if the wind is too strong or the power production exceeds the demand.

FIG. 6a illustrates the control loop for another preferred embodiment of the invention, where motor speed is to be kept constant for the use with the synchronous generator. The figure illustrates how the difference between the motor actual speed and motor set speeds will vary the motor displacement until equilibrium conditions are achieved. The control action will provide a controlled motor speed under varying power load conditions on the generator and under varying wind speeds. The motor set speed is calculated from the required output frequency ($f_{des}$) of the generator (9). This control loop is relevant for controlling the motor speed for use with a synchronous generator and may be used both for a stiff grid and for local power consumption. The turbine speed will operate at the intersection between the generator torque versus rotational speed curve and the control characteristic and adjust turbine rotational speed according to consumed output power.

FIG. 6b illustrates, in addition to FIG. 6a, a lower part which shows that the turbine speed and consequently the efficiency of the power production system will be affected, through the system dynamics, by any motor control actions. To maximise the efficiency of the entire system, the pitch of the turbine blades may be controlled so as for maintaining the optimised tip speed ratio ($TSR_{opt}$).

General Mechanical Setup of the Power Production System

An example of how the system according to the invention may be realised is described in the following. The power production system (1) of FIG. 7 is arranged at the top of a wind turbine tower (62) of known design. The power production system (1) is arranged on a rotating bearing (63) so that the power production system (1) can pivot at the top of the tower (62), with a bull gear (64) and a yaw drive (65) that may be controlled by a turbine direction controller of a suitable kind.

On the rotating bearing (63) a base frame (66) is permanently attached. The base frame (66) carries the operating parts of the wind turbine plant, which comprises a wind turbine hub (67) with the wind turbine blades (68) on a turbine shaft (69) mounted in a bearing (70) and connected to a hydraulic displacement pump (6) and having a braking disc (73) arranged between the bearing (70) and the hydraulic displacement pump (6).

The hydraulic fixed displacement pump (6) is connected to a variable displacement hydraulic motor (8) by a supply pipe (75) and a return pipe (76). The hydraulic fluid required by the hydrostatic system to replace fluid that is lost to external leakage is supplied by pump (33) from a reservoir (77), please see FIG. 7. The operation of the power production system (1) is controlled by three control circuits shown schematically in FIG. 7: a control circuit (15) which may comprise said turbine blade pitch control subsystem (15b), and which shall comprise said motor displacement control subsystem (15a) for the motor. The choice of the speed control function is dependent on the further connection of the generator (9) to a "stiff" power grid or to a local power consumption system. The pitch control subsystem (15b) may provide a control signal to control the pressure of hydraulic fluid through the turbine shaft (69) from the hydraulic displacement pump (6).

A housing or nacelle (32) covers the elements of the power production system (1) except for the wind turbine hub (67) and its turbine blades (68).

FIG. 8 illustrates schematically the elements of the wind power production system (1) together with the hydraulic elements and the elements of the control systems.

The pump (6) and the motor (8) are arranged as a closed circuit hydrostatic system (7), which may be boosted by flow from the reservoir by pump (33). The circuit contains elements for controlling pressure and cooling flow for the pump (6) and motor (8). The turbine hub (67) contains the mounting for the blades (68), the angle ($\alpha_p$) of which are adjusted by an actuator controlled by a pitch control subsystem (15b) where this is required. Flow for this purpose may be taken from the pump (6) as may be any flow required to operate the brake (73).

The motor displacement control subsystem (15a) serves to provide control signals (16) to the motor displacement actuator (78) for varying the motor displacement (d) in accordance with the requirement to control the displacement of the motor in order to indirectly control either the rotational speed ($\omega$) of the turbine (2) and/or to directly control the rotational speed ($\omega_g$) of the motor (8).

The pressure output from booster pump (33) is controlled by a relief valve (42) and takes its flow from the reservoir through filter (41). This pressurised flow is passed into the low-pressure side of the hydrostatic circuit (7) by means of either of the check valves (37). Flow from the relief valve (42) is taken through the casings of the pump (6) and motor (8) for the purposes of cooling these units. Flow can also be extracted from the high pressure circuit by means of the purge valve (39) and the relief valve (40), this flow being added to the cooling flow into the casing of pump (6). The cooling flow from the casing of motor (8) is passed through the cooler (44) and filter (45) after which it is returned to the reservoir (77). Under conditions when the hydrostatic system pressure exceeds a predetermined value, either of the relief valves (38) will open to pass flow to the low-pressure side of the hydrostatic system.

FIG. 8 further illustrates a circuit for braking and arresting the turbine pump if so is required. A line comprising a choke valve (31a) and a shut-off valve (31b) is arranged between the output and the input of the pump (6). A three-way valve (31c) is arranged on the main output line from the pump (6) arranged for redirecting the flow from the pump to the motor to run through the choke valve and the shut-off valve and return to the pump. This will brake the pump when activated, and when the speed is reduced the shut-off valve may eventually be closed to halt the pump.

The turbine hub (67) contains the mounting for the blades (68) the angle of which are controlled by a pitch control actuator (79) commanded by control signal (20) from a pitch control subsystem (15b). Flow for this purpose and any flow that is required to operate the brake (73) is supplied from the pump (6). An accumulator (34), which contains a volume of fluid that is maintained under pressure by a gas, is connected to this circuit so that the pitch control can be operated in the absence of pressure in the hydrostatic circuit. The brake (73) is kept on by springs (36) and released by system pressure when the valve (35) is operated. Check valve (43) is opened so as to charge the accumulator (34) when its pressure is lower than that in the hydrostatic circuit (7).

For the improvement of the dynamic performance of the speed control and its stability, known compensation techniques can be applied to the motor displacement control subsystem (15a). These include the feedback of the hydraulic pressure and the use of PID (proportional, integral and derivative) control circuits that will allow the system gain to be increased which will improve the damping and steady state accuracy.

During conditions such as the generator 'dropping out' of the grid so that there is no resistive torque at the motor shaft it is necessary to prevent runaway speed of the turbine. A fast acting valve can be incorporated into the circuit which operates so that the pump flow bypasses the motor whilst maintaining the hydraulic pressure.

In a situation where the main purpose of the electric power production system (1) is to provide energy to a "stiff" grid (14) according to the first preferred embodiment of the invention and the connection to the "stiff" grid (14) is unintentionally lost due to a major failure in the utility network or lost due to a planned maintenance operation, the operation of the power production system (1) can be automatically or manually switched to the second preferred embodiment of the invention by changing the mode of the control system (15) and continue to produce power to a local grid that would else suffer from power outage.

In the opposite situation where the present function of the electric power production system (1) is to provide energy to a local power consumption system (13) according to the second preferred embodiment of the invention and the connection to the "stiff" grid (14) is re-established, the operation of the power production system (1) can be automatically or manually switched to the first preferred embodiment of the invention by changing the mode of the control system (15) and switch to produce power to a "stiff" grid (14).

Pump Displacement Control

The displacement of the hydrostatic pump (6) can be either fixed or variable. For a variable displacement pump, the displacement can be arranged to be selected, e.g. as a schedule with the speed of the wind/water or to maintain a constant delivery pressure. This can provide advantages that would not be available with a fixed displacement pump. Such advantages could include: an overall increase in the efficiency of the hydrostatic transmission, improvements in the control characteristics by creating a constant hydrostatic pressure, and the control of high pressure peaks without the need to bypass high pressure, thus avoiding the generation of unnecessary heat.

In FIG. 9, a multiple unit wind power plant is shown. On each of four towers (46, 47, 48, 49), a wind turbine (50) and a hydraulic pump (51) are arranged. From each pump (51) a double hydraulic pipeline (42) is connected to a common variable displacement hydraulic motor (53) powering an electric generator (54). In this embodiment, the control system for each turbine is connected to a common control circuit for the hydraulic motor (53). Check valves (55) may be arranged for each pump output so as for preventing backflow to the turbines producing less fluid flow or insufficient pressure.

The transmission system described above can be adapted for similar purposes incorporating one or more motors, particularly for a multitude of power converting units.

This specification is based on the use of AC generators. However, a DC generator may be used if one should desire to do so.

This specification generally defines the turbine (2) to be a turbine being driven by a fluid (3) in which said fluid is wind, i.e. moving air. Alternatively, the fluid may be water moving in a watercurrent such as a river stream, tidal currents or sea currents. Analogous to what is illustrated in FIG. 9 illustrating a particular embodiment of the invention with multiple wind turbine units powering a single hydraulic motor and generator assembly situated on the ground. Alternatively, one or more sea wave driven hydrostatic pumps may be connected in a hydrostatic circuit to one or more hydrostatic motors connected to an electric generator.

The term "volumetric displacement (d)" of said hydrostatic motor (8) has been used throughout this specification, although strictly said it should be called "volumetric displacement capacity (d)", i.e. the throughput volume per radian turn of the shaft of said hydrostatic motor (8).

PARTS LIST

1: electric power production system
2: turbine, e.g. wind turbine, water turbine
3: moving fluid, e.g. wind or water current
6: hydrostatic pump driven by turbine (2)
7: closed loop hydrostatic transmission system
8: displacement motor driving generator (10)
9: electric generator
10: produced AC power
$f_g$: frequency of the produced AC power
$f_{des}$: desired frequency, either a measured frequency $f_{meas}$ on the external (stiff) grid or a required frequency $f_{req}$ for a variable-local power consumer.
$f_{local}$: a fixed required frequency of the local power consumption system (13)
11m a fluid speed meter for measuring the speed (v) of fluid (3)
11s: speed signal representing the speed (v) of fluid (3).
v: speed of fluid (3)
12m, rotational speed meter for measuring the rotational speed (ω) of turbine (2)
12s: rotational speed signal representing the rotational speed (ω) of turbine (2)
ω rotational speed of turbine (2).
13: local power consumption system (variable power consumption)
14: electrical power grid (stiff)
15: control system
15a: motor displacement control subsystem
15b: pitch control subsystem
15e: excitation control
16: control signal from control system 15 for adjusting the volumetric displacement (d) of motor 8
$tsr_{set}$ set tip speed ratio of turbine (2)
d: volumetric displacement control actuator (17) on hydrostatic motor (8), for receiving said control signal (16) for continuously adjusting a volumetric displacement (d) of said hydrostatic motor (8)
18m: rotational speed meter for measuring the rotational speed ($ω_g$) of the generator (9)
18s: signal representing the rotational speed ($ω_g$) of the generator (9)
$ω_g$: rotational speed of the generator (9) and the displacement motor (8)
19m: pitch meter for measuring the angle ($α_p$) of the turbine blades (68)
19s: signal representing the angle ($α_p$) of the turbine blades (68)
$α_p$: the angle of the turbine blades (68)
20: blade angle ($w_g$) control signal
31a: choke valve
31b: shut-off valve
32: nacelle
33: hydraulic oil pump used for replacing fluid in the closed loop of the hydrostatic system (7) that is lost due to external leakage.
34: accumulator containing a volume of fluid that is maintained under pressure by a gas
35: valve
36: springs used for braking the turbine (2). The springs are released by system pressure when the valve (35) is operated.
37: check valves for passing pressurised flow from the pump (33) into the low-pressure side of the hydrostatic circuit
38: relief valves
39: purge valve
40: relief valve
41: filter for filtering the fluid before it reaches the pump (33)
42: relief valve for controlling the output pressure from the pump (33)
43: check valve that is opened so as to charge the accumulator when its pressure is lower than that in the hydrostatic circuit
44: cooler
45: filter 46-49: wind turbine towers
50: wind turbine
51: hydraulic pump
52: double hydraulic pipeline
53: hydraulic motor
54: electric generator
55: check valves
62: tower
63: foundation
64: bull gear
65: yaw drive
66: base frame
67: wind turbine
68: wind turbine blades
69: turbine shaft
70: bearing
73: brake
75: hydrostatic transmission system (7) closed loop supply pipe
76: hydrostatic transmission system (7) closed loop return pipe
77: reservoir
78: motor displacement actuator
79: pitch control actuator

The invention claimed is:

1. A turbine driven electric power production system (1), comprising
   a turbine (2) arranged for being driven by a fluid (3) having a fluid speed (v) varying in time,
   said turbine (2) connected to a hydrostatic displacement pump (6) further connected to a hydrostatic displacement motor (8) as part of a hydrostatic transmission system (7),
   said motor (8) arranged for driving an electrical generator (9) supplying AC power (10) at a frequency ($f_g$) near a given desired frequency ($f_{des}$),
   characterized by
   a closed loop control system (15,15a) arranged for continuously receiving a speed signal (11) representing the speed (v) of said fluid (3), from a fluid speed meter (11m), and further arranged for continuously receiving a turbine rotational speed signal (12s) representing the rotational speed measurement (ω) of said turbine (2), from a turbine rotational speed sensor (12m),
   based on said wind speed and turbine rotational speed signals (11, 12s), calculating a control signal (16) for a volumetric displacement control actuator (17) on said hydrostatic motor for continuously adjusting a volumetric displacement (d) of said hydrostatic motor (8), so as for enabling to maintain a set turbine tip speed ratio ($tsr_{set}$) and thereby achieving an improved power efficiency of the power production system (1) during fluctuations in said fluid speed (v).

2. The system according to claim 1, said electrical generator (9) arranged for being connected to an electric grid (14), said given desired frequency ($f_{des}$) being a frequency ($f_{grid}$) of said electric grid (14) affecting or dominating said frequency ($f_g$) of said electrical generator (9) so as for controlling said generator (9) to operate at the frequency of said electric grid (14).

3. The system according to claim 1, said electrical generator (9) being connected to a local power consumption system (13) having a frequency affected by said electrical generator (9) supplying AC power (10) at a frequency ($f_g$), said given desired frequency ($f_{des}$) being a fixed required frequency ($f_{local}$) of said local power consumption system (13).

4. The system according to claim 1, said generator (9) being a synchronous generator.

5. The system according to claim 1, said generator (9) being an asynchronous generator.

6. The system according to claim 1, further comprising
   a motor rotational speed sensor (18m) providing a motor speed signal (18s) representing the motor rotational speed ($ω_g$) of said motor (8), for being input to said control system (15).

7. The turbine driven electric power production system (1) of claim 6, comprising, in addition to said synchronous generator (9) an excitation control (15e) for further stabilising the output voltage frequency and providing reactive power (Xc).

8. The system according to claim 1, further comprising
   a turbine pitch angle sensor (19m) providing a turbine blade pitch signal (19s) representing the turbine blade pitch angle ($α_p$), for being input to said control system (15),
   said control system (15) further arranged for calculating a turbine blade pitch angle control signal (20),
   so as for controlling said pitch angle ($α_p$).

9. The turbine driven electric power production system (1) according to claim 1, said hydrostatic transmission system (7) being a closed-loop hydrostatic transmission system (7).

10. The turbine driven electric power production system (1) of claim 1, comprising a hydraulic line with choke valve (31a) and a shut-off valve (31b) arranged between the output and the input of the pump (6), with a three-way valve (31c) arranged on the main output line from the pump (6) arranged for redirecting the flow from the pump to the motor to run through the choke valve and the shut-off valve and return to the pump.

11. A method for controlling a turbine driven electric power production system (1) where the turbine electric power production system (1) comprises a turbine (2),
   said turbine (2) being driven by a fluid (3), said fluid (3) having a fluid speed (v) varying in time,
   said turbine (2) driving a hydrostatic displacement pump (6) further connected to a hydrostatic displacement motor (8) as part of a hydrostatic transmission system (7),
   said motor (8) driving an electrical generator (9) supplying AC power (10) at a frequency ($f_g$) near a given desired frequency ($f_{des}$),
   characterized by
   continuously receiving a speed signal (11) representing the speed (v) of said fluid (3), from a fluid speed meter (11m), and
   continuously receiving a turbine rotational speed signal (12s) representing the rotational speed measurement (ω) of said turbine (2), from a turbine rotational speed sensor (12m), and
   based on said wind speed and turbine rotational speed signals (11, 12s), calculating a control signal (16) for the volumetric displacement control actuator (17) on said hydrostatic motor so as for continuously adjusting a volumetric displacement (d) of said hydrostatic motor (8).

* * * * *